United States Patent [19]

Jones et al.

[11] Patent Number: 5,708,046
[45] Date of Patent: Jan. 13, 1998

[54] SILICONE RELEASE COATING COMPOSTIONS

[75] Inventors: John Darrell Jones; Michael Ward Skinner, both of Midland, Mich.; Nobuo Kaiya, Chiba-Prefecture, Japan; Atsushi Togashi, Chiba Prefecture, Japan; Takateru Yamada, Chiba Prefecture, Japan

[73] Assignees: Dow Corning Corporation, Midland, Mich.; Dow Corning Toray Silicone Co., Ltd., Tokyo, Japan

[21] Appl. No.: 716,981

[22] Filed: Sep. 20, 1996

[30] Foreign Application Priority Data

Sep. 21, 1995 [JP] Japan ................... 7-267665
Nov. 24, 1995 [JP] Japan ................... 7-329528

[51] Int. Cl.$^6$ .................................................. C08F 2/46
[52] U.S. Cl. .................. 522/99; 522/148; 528/15; 528/18; 528/20; 524/770; 524/792; 524/861; 524/862; 427/515; 428/447
[58] Field of Search ................. 528/15, 18, 20; 522/99, 148; 524/861, 862, 770, 792; 427/515

[56] References Cited

U.S. PATENT DOCUMENTS

| | | | |
|---|---|---|---|
| 2,823,218 | 2/1958 | Speier et al. | 260/448.2 |
| 3,383,356 | 5/1968 | Nielsen | 260/46.5 |
| 3,419,593 | 12/1968 | Wililng | 260/448.2 |
| 3,445,420 | 5/1969 | Kookootsedes | 260/37 |
| 3,461,185 | 8/1969 | Brown | 260/825 |
| 3,923,705 | 12/1975 | Smith | 260/2.5 S |
| 4,032,502 | 6/1977 | Lee et al. | 260/37 |
| 4,154,714 | 5/1979 | Hockemeyer et al. | 260/31.2 R |
| 4,472,562 | 9/1984 | Shirahata | 528/15 |
| 4,472,563 | 9/1984 | Chandra et al. | 528/15 |
| 4,609,574 | 9/1986 | Keryk et al. | 427/407.1 |
| 5,270,425 | 12/1993 | VanWert et al. | 528/15 |

FOREIGN PATENT DOCUMENTS

| | | | |
|---|---|---|---|
| 76028119 | 11/1973 | Japan | C08L 83/04 |
| 12786 | 1/1986 | Japan | C08L 83/07 |
| 1563063 | 1/1976 | United Kingdom | C08L 83/04 |

*Primary Examiner*—Melvyn I. Marquis
*Attorney, Agent, or Firm*—Timothy J. Troy

[57] ABSTRACT

The present invention relates to a curable silicone release coating composition comprising a mixture of an organopolysiloxane containing at least two alkenyl groups per compound, an organohydrogensilicon compound, inhibitors having a boiling point of up to 130° C. at atmospheric pressure, inhibitors having a boiling point of at least 170° C. at atmospheric pressure a platinum group metal-containing catalyst, and optionally a diluent. The silicone release coating compositions are stable when stored at room temperature, especially when the composition is used on a coating roll for the production of a thin films. The compositions of this invention also quickly form a cured film having good release properties for adhesive materials at a comparatively low temperatures.

28 Claims, No Drawings

SILICONE RELEASE COATING COMPOSTIONS

BACKGROUND OF THE INVENTION

The present invention relates to silicone release coating compositions. More particularly, the present invention relates to silicone release coating compositions containing a mixture of certain inhibitors which are stable when stored at room temperature, especially when used on a coating roll to make thin films, and silicone release coatings which can be cured quickly at low temperatures.

Organosilicon compositions in which a platinum group metal containing catalyst is inhibited in its cure-promoting activity at room temperature by the presence of an acetylenic compound have been taught in the organosilicon art. For example, Nielsen, in U.S. Pat. No. 3,383,356 discloses a process for reducing the activity of platinum compound catalysts employed to effect copolymerization of a mixture of copolymerizable ingredients comprising an alkenyl polysiloxane and a hydrogen polysiloxane which comprises incorporating in the mixture of ingredients in an amount of from 6 to 85% by weight of the total mixture, a halocarbon which acts as a catalyst inhibitor such as ethylene tetrachloride.

Kookootsedes et al. in U.S. Pat. No. 3,445,420 discloses a curable composition which can be stored in the presence of a catalyst but cures rapidly by heating or exposure to the atmosphere is a mixture of an olefin containing organosilicon polymer, an organosilicon compound containing silicon-bonded hydrogen atoms, a platinum catalyst, and an acetylenic compound which includes various organic acetylenic compounds such as 3-methyl-1-butyn-3-ol and silylated acetylenic compounds.

Brown in U.S. Pat. No. 3,461,185 discloses a curable organosilicon polymer containing at least two monovalent hydrocarbon radicals having aliphatic unsaturation, an organosilicon compound having at least two silicon-bonded hydrogen atoms, a platinum catalyst, and tetramethylguanidine carboxylate as an inhibitor.

Japanese Patent No. 76028119 (28,119/1976) discloses a composition containing a polysiloxane having silicon-bonded vinyl endgroups, a polysiloxane having at least 3 silicon-bonded hydrogen endgroups, a catalytic amount of platinum, and poly(aminoalkylsiloxane).

U.S. Pat. No. 4,032,502 discloses organopolysiloxane compositions produced by mixing a vinyl-endblocked polydiorganosiloxane fluid copolymer containing dimethylsiloxane units and methyl-3,3,3-trifluoropropylsiloxane units, a treated reinforcing silica filler, a platinum containing catalyst, a curing agent comprising dimethylhydrogensiloxane units, and an inhibitor such as acetylenic silanes, acetylenic siloxanes, olefinic siloxanes, or vinylorganocyclosiloxanes.

Great Britain Patent Specification No. 1563063 discloses curable organopolysiloxane compositions comprising an organopolysiloxane having at least two silicon-bonded vinyl groups, an organohydrogensiloxane free of aliphatic unsaturation having at least two silicon-bonded hydrogen atoms, a platinum catalyst, and an alkynyloxy group-containing organopolysiloxane containing at least one monovalent hydrocarbon group which has a —C≡C— linkage and is bonded to silicon through an oxygen-silicon linkage.

Shirahata in U.S. Pat. No. 4,472,562 discloses storage stable polyorganosiloxane compositions which comprise a vinyl containing polyorganosiloxane, a polyorganosiloxane containing silicon-bonded hydrogen atoms, a platinum, palladium, or rhodium catalyst, and a silane of the general formula $R^4Si(OC(R^5)(R^6)-C\equiv CH)_3$ wherein $R^4$, $R^5$, and $R^6$ are identical or different monovalent hydrocarbon radicals containing from 1 to 10 carbon atoms, or $R^5$ and $R^6$ jointly form a divalent hydrocarbon radical.

Japanese Patent Publication No. 1-12786 (12,786/1989) discloses a silicone composition for mold-release paper, composed of (1) 100 parts by weight of an organopolysiloxane that has a viscosity of 50 centistokes or greater at 25° C., contains at least two bonds between a vinyl group and a silicon atom in each molecule and has an essentially linear structure, (2) 0.2 to 50 parts by weight of an organopolysiloxane having at least two bonds between hydrogen atoms and silicon atoms in each molecule, (3) 2–500 ppm of a platinum compound in terms of metallic platinum with respect to component (1) indicated above, and (4) 0.1 to 10 parts by weight of an organosilicon compound having the general formula

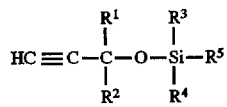

or

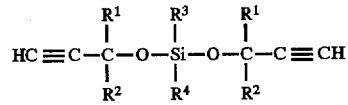

wherein $R^1$, $R^2$, $R^3$, $R^4$, and $R^5$ denote hydrogen atoms or the same or different substituted or unsubstituted aliphatic monovalent hydrocarbon groups having 1 to 10 carbon atoms that has a boiling point of 250° C. or less and has acetylenic unsaturated groups that are compatible with the aforementioned first or second organopolysiloxane components.

Methylvinylcyclosiloxanes have also been disclosed as inhibitors for platinum group metal containing catalysts. For example, Smith, in U.S. Pat. No. 3,923,705 discloses that siloxane foams which comprise an organohydrogensiloxane, a hydroxylated organosiloxane, and a platinum catalyst, and optionally a vinyl containing triorganosiloxy endblocked polydiorganosiloxane can also contain platinum catalyst inhibitors, such as polymethylvinylsiloxane cyclics and acetylenic inhibitors, for example, 3-methyl-1-butyne-3-ol, which extend the pot life before foaming occurs.

Mixtures of vinylorganocyclosiloxanes and other types of inhibitors have also been disclosed. For example, VanWert et al. in U.S. Pat. No. 5,270,425 discloses one part organosiloxane compositions exhibiting long term storage stability under ambient conditions comprising a specified combination of platinum catalyst inhibitors and an adhesion promoting composition consisting essentially of a vinyltrialkoxysilane, an epoxy-substituted alkoxysilane, a vinyl containing hydroxylated organopolysiloxane, and a chelated aluminum compound. It is further taught by VanWert et al. that the combination of platinum catalyst inhibitors is a mixture of cyclic methylvinylsiloxane oligomer and an acetylenic alcohol containing at least 6 carbon atoms such as 3,5-dimethyl-1-hexyne-3-ol, and optionally benzyl alcohol.

Chandra et al. in U.S. Pat. No. 4,472,563 discloses curable silicone compositions comprising the combination of a polyorganosiloxane having vinyl containing radicals, a polyorganosiloxane containing hydrogen atoms bonded to silicon atoms, a catalyst, a conjugated ene-yne having (1) from 5 to 12 carbon atoms; (2) a terminal ethynyl group, and (3) an ethenyl group in conjugation with said ethynyl group, and a vinylcyclosiloxane. It is further taught that the combination of vinylcyclosiloxanes in combination with one or more conjugated ene-ynes results in room temperature inhibition of cure that is 5 or more times as effective as the room temperature inhibition of cure observed for comparable levels of either the ene-yne or the vinylcyclosiloxane independently.

However, none of the references cited hereinabove disclose the mixtures of particular inhibitors employed in the curable coating compositions of the present invention.

SUMMARY OF THE INVENTION

The present invention relates to silicone release coating compositions comprising an alkenyl functional organopolysiloxane, an organohydrogensilicon compound, a platinum group metal-containing catalyst, and a mixture of certain inhibitors.

It is an object of the present invention to produce a silicone release coating which, when coated onto a substrate, undergoes no gelation even when coated at comparatively low temperatures.

It is another object of the present invention to produce silicone release coating compositions which are stable but cure rapidly when exposed to elevated temperatures.

It is a further object of this invention to provide a silicone release coating which has good bath life and is also able to be cured at low temperatures.

DETAILED DESCRIPTION OF THE INVENTION

The first embodiment of the present invention relates to a curable silicone release coating composition comprising a mixture of (A) an organopolysiloxane containing at least two alkenyl groups per compound, (B) an organohydrogensilicon compound, (C) an inhibitor having a boiling point of up to 130° C. at atmospheric pressure selected from the group consisting of acetylenic alcohols and silylated acetylenic alcohols, (D) an inhibitor having a boiling point of at least 170° C. at atmospheric pressure selected from the group consisting of vinylcyclosiloxanes, acetylenic alcohols, and silylated acetylenic alcohols, (E) a platinum group metal-containing catalyst, and optionally (F) a diluent.

The alkenyl groups of component (A) include groups such as vinyl, allyl, 3-butenyl, 4-pentenyl, 5-hexenyl, 6-heptenyl, 7-octenyl, 8-nonenyl, 9-decenyl, 10-undecenyl, 4,7-octadienyl, 5,8-nonadienyl, 5,9-decadienyl, 6,11-dodecadienyl, and 4,8-nonadienyl.

Preferably component (A) is an organopolysiloxane compound having its formula selected from the group consisting of (i) $R^1{}_3SiO(R_2SiO)_x(RR^1SiO)_ySiR^1{}_3$, (ii) $R^1{}_3SiO(R_2SiO)_xSiR^1{}_3$, and (iii) $R^1{}_3SiO(RR^1SiO)_ySiR^1{}_3$ wherein R is independently selected from monovalent hydrocarbon or halohydrocarbon radicals free of aliphatic unsaturation and having from 1 to 20 carbon atoms, $R^1$ is independently selected from the group consisting of R and an alkenyl group, x has a value of from greater than zero to 7000, and y has a value of from greater than zero to 350 with the proviso that there are at least two alkenyl groups per compound.

The monovalent radicals of R in compound (A) can contain up to 20 carbon atoms and include hydrocarbon or halohydrocarbon radicals free of aliphatic unsaturation.

Monovalent hydrocarbon radicals free of aliphatic unsaturation include alkyl radicals such as methyl, ethyl, propyl, butyl, hexyl, octyl, and decyl, cycloaliphatic radicals such as cyclohexyl, aryl radicals such as phenyl, tolyl, and xylyl, and aralkyl radicals such as benzyl and phenylethyl. Highly preferred monovalent hydrocarbon radicals for R are methyl and phenyl. Monovalent halohydrocarbon radicals free of aliphatic unsaturation include any monovalent hydrocarbon radical noted above which is free of aliphatic unsaturation and has at least one of its hydrogen atoms replaced with a halogen, such as fluorine, chlorine, or bromine. Preferred monovalent halohydrocarbon radicals have the formula $C_nF_{2n+1}CH_2CH_2$— wherein the subscript n has a value of from 1 to 10, such as, for example, $CF_3CH_2CH_2$— and $C_4F_9CH_2CH_2$—. The several R radicals can be identical or different, as desired, and preferably at least 50 percent of all R radicals are methyl.

The alkenyl group of $R^1$ is preferably a group having the formula —$(CH_2)_mCH=CH_2$ or —$(CH_2)_nCH=CH$—$(CH_2)_pCH=CH_2$ wherein m has a value of 0 to 20, n has the value of 0 to 9, and p has the value of 3, 4, or 5. The disclosure of U.S. Pat. No. 4,609,574, incorporated herein by reference, shows highly-preferred higher alkenyl functional organopolysiloxanes.

It is highly preferred that component (A) is an organopolysiloxane compound having its formula selected from the group consisting of $ViMe_2SiO(Me_2SiO)_xSiMe_2Vi$, $Me_3SiO(Me_2SiO)_x(MeViSiO)_ySiMe_3$, $Me_3SiO(MeViSiO)_ySiMe_3$, $ViMe_2SiO(Me_2SiO)_x(MeViSiO)_ySiMe_2Vi$, $ViMe_2SiO(MeViSiO)_ySiMe_2Vi$ $HexMe_2SiO(Me_2SiO)_xSiMe_2Hex$, $Me_3SiO(Me_2SiO)_x(MeHexSiO)_ySiMe_3$, $Me_3SiO(MeHexSiO)_ySiMe_3$, $HexMe_2SiO(Me_2SiO)_x(MeHexSiO)_ySiMe_2Hex$, and $HexMe_2SiO(MeHexSiO)_ySiMe_2Hex$ wherein Me, Vi, and Hex denote methyl, vinyl, and 5-hexenyl, respectively, x has a value of from greater than zero to 7000, and y has a value of from greater than zero to 350. Preferably x has a value of from 10 to 200, and y has a value of from 1 to 10.

The value of the subscripts x and y above are such that the organopolysiloxane compound of Component (A) preferably has a viscosity at 25° C. of at least 40 millipascal-seconds (mPa·s) (1 mPa·s=1 centipoise (cP)). Component (A) can have an ultrahigh viscosity similar to a state of raw rubber. If the viscosity is less than 40 mPa·s, the composition may be difficult to coat onto a substrate. If the compositions of the present invention are solventless, the viscosity at 25° C. of the component is preferably 40–10,000 mPa·s, and especially 40–5000 mPa·s. If the compositions are in the form of a solution, the viscosity can range from 100,000 mPa·s to the viscosity of a raw rubber composition, however, it is preferred that if the composition is in the form of a solution that component (A) have a viscosity of 500,000 mPa·s or more.

The alkenyl functional organopolysiloxanes of Component (A) are well known in the art, many of these being available commercially, and further description thereof is considered unnecessary.

Component (B) is an organohydrogensilicon compound. Component (B) is preferably an organohydrogensilicon compound which is free of aliphatic unsaturation and contains two or more silicon atoms linked by divalent radicals, an average of from one to two silicon-bonded monovalent radicals per silicon atom and an average of at least two, and preferably three, or more silicon-bonded hydrogen atoms per compound. Preferably the organohydrogensiloxane (B) contains an average of three or more silicon-bonded hydrogen atoms such as, for example, 5, 10, 20, 40, 70, 100, or more. The organohydrogensiloxane compounds suitable as Component (B) can be linear, branched, cyclic, and combinations thereof. The viscosity at 25° C. is preferably 1 to 1,000 mPa·s, and it is highly preferred that the viscosity of component (B) is from 5 to 500 mPa·s. When the viscosity is less than 1 mPa·s, the composition will be susceptible to rapid evaporation, and when the viscosity is greater than 1,000 mPa·s, the formation of cured film having suitable release properties will take a longer period of time.

Examples of organopolysiloxanes which are suitable as component (B) include $HMe_2SiO(Me_2SiO)_cSiMe_2H$, $(HMe_2SiO)_4Si$, cyclo-$(MeHSiO)_c$, $(CF_3CH_2CH_2)MeHSiO\{Me(CF_3CH_2CH_2)SiO\}_cSiHMe(CH_2CH_2CF_3)$, $Me_3SiO(MeHSiO)_cSiMe_3$, $HMe_2SiO(Me_2SiO)_{0.5c}(MeHSiO)_{0.5c}SiMe_2H$, $HMe_2SiO(Me_2SiO)_{0.5c}(MePhSiO)_{0.1c}(MeHSiO)_{0.4c}SiMe_2H$, $Me_3SiO(Me_2SiO)_{0.3c}(MeHSiO)_{0.7c}SiMe_3$ and $MeSi(OSiMe_2H)_3$ where c has a value of from about 0 to about 1000.

Especially preferred as Component (B) are methylhydrogensiloxanes selected from the group consisting of bis(trimethylsiloxy)dimethyldihydrogendisiloxane, heptamethylhydrogentrisiloxane, hexamethyldihydrogentrisiloxane, methylhydrogencyclosiloxanes, pentamethylpentahydrogencyclopentasiloxane, pentamethylhydrogendisiloxane, polymethylhydrogensiloxanes, tetramethyltetrahydrogencyclotetrasiloxane, tetramethyldihydrogendisiloxane, and methylhydrogensiloxane-dimethylsiloxane copolymers. The disclosure of U.S. Pat. No. 4,154,714, incorporated herein by reference, shows preferred organohydrogenpolysiloxanes.

It is particularly preferred that component (B) is a compound having its formula selected from the group consisting of $HMe_2SiO(Me_2SiO)_a(MeHSiO)_bSiMe_2H$, $HMe_2SiO(Me_2SiO)_aSiMe_2H$, $Me_3SiO(Me_2SiO)_a(MeHSiO)_bSiMe_3$, $HMe_2SiO(MeHSiO)_bSiMe_2H$, and $Me_3SiO(MeHSiO)_bSiMe_3$ wherein Me denotes methyl wherein a has a value of from greater than zero to 1000 and b has a value of from greater than zero to 200.

The organohydrogensiloxanes of Component (B) are well known in the art, many of these being available commercially, and further description thereof is considered unnecessary.

It is preferred that from 0.5 to 90 parts by weight of Component (B) be used, and it is highly preferred that from 2 to 20 parts by weight of Component (B) be employed per 100 parts by weight of Component (A). When less than 2 parts by weight of the component are present, the formation rate of the cured film decreases. When more than 20 parts by weight of the component are present, the release properties of the cured film deteriorate.

Component (C) is an inhibitor having a boiling point of up to 130° C. at atmospheric pressure selected from the group consisting of acetylenic alcohols and silylated acetylenic alcohols. The combination of Component (C) and component (D) (described hereinbelow), inhibits the addition reaction of the alkenyl group used as component (A) with the silicon-atom-bonded hydrogen atom used as component (B) and it is effective in increasing the stability of the composition when the composition of the present invention is stored. Acetylenic alcohols suitable as (C) are exemplified by compounds having the formula

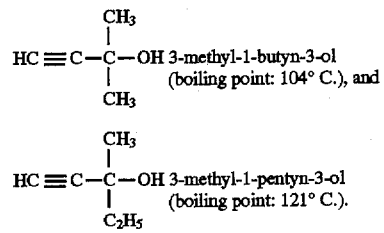

Silylated acetylenic alcohols suitable as (C) are exemplified by compounds such as

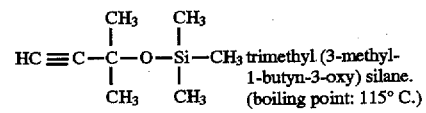

Component (D) is an inhibitor having a boiling point of at least 170° C. at atmospheric pressure selected from the group consisting of vinylcyclosiloxanes, acetylenic alcohols, and silylated acetylenic alcohols. The vinylcyclosiloxane is preferably a compound having the average formula —$(R_2CH_2=CHSiO)_m$— wherein each m has an integer value of 3 to 9 and $R^2$ is selected from the group consisting of methyl, ethyl, and phenyl groups. Preferably $R^2$ is methyl. Vinylcyclosiloxanes generally have a boiling point of at least 200° C.. Vinylcyclosiloxanes are frequently furnished as mixtures in which m has an average value of between 4 and 5. It is to be understood that this average value encompasses species wherein m is 3, 4, 5, 6, 7, 8, and higher integers. It is not believed that the inclusion of small amounts, such as 10 or 15 mole percent, of other diorganosiloxane units such as $(Me_2SiO)$ units or $(MeC_6H_5SiO)$ units wherein Me denotes methyl has any significant effect.

Vinylcyclosiloxanes are well known intermediates in organosilicon chemistry and they are readily commercially available and therefore further description thereof is considered unnecessary.

Acetylenic alcohols suitable as component (D) are exemplified by compounds having the formula

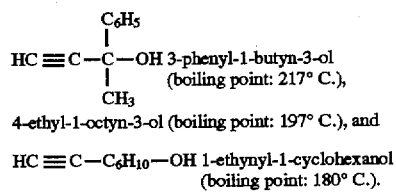

Silylated acetylenic alcohols suitable as component (D) are exemplified by compounds having the formula

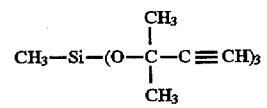

methyltris(3-methyl-1-butyn-3-oxy) silane, (boiling point: at least 200° C.)

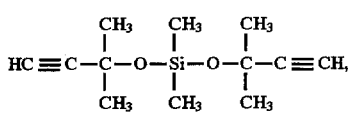

dimethyl bis(3-methyl-1-butyn-3-oxy)silane  
(boiling point: 186° C.)

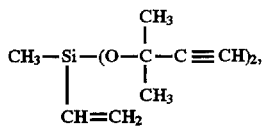

methylvinylbis(3-methyl-1-butyn-3-oxy)silane,  
(boiling point: at least 200° C.)

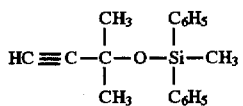

diphenylmethyl(3-methyl-1-butyn-3-oxy)silane,  
(boiling point: above 170° C.)

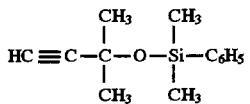

dimethylphenyl(3-methyl-1-butyn-3-oxy)silane,  
(boiling point: above 170° C.)

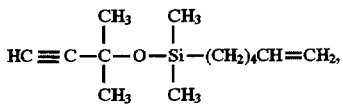

dimethylhexenyl(3-methyl-1-butyn-3-oxy)silane  
(boiling point: above 170° C.)

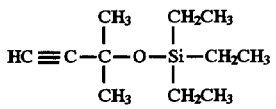

triethyl (3-methyl-1-butyn-3-oxy)silane,  
(boiling point: above 170° C.)

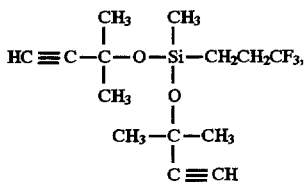

methyltrifluoropropyl bis(3-methyl-1-butyn-3-oxy)silane  
(boiling point: above 170° C.)

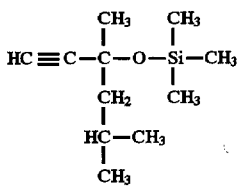

trimethyl(3,5-dimethyl-1-hexyn-3-oxy)silane,  
(boiling point: 171° C.)

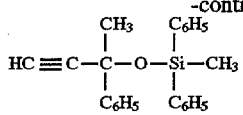

diphenylmethyl(3-phenyl-1-butyn-3-oxy)silane,  
(boiling point: above 170° C.)

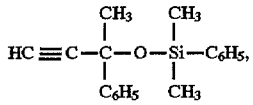

dimethylphenyl(3-phenyl-1-butyn-3-oxy)silane  
(boiling point: above 170° C.)

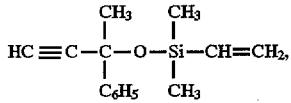

dimethylvinyl(3-phenyl-1-butyn-3-oxy)silane  
(boiling point: above 170° C.)

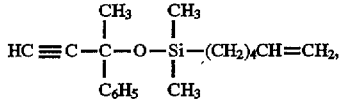

(dimethylhexenyl(3-phenyl-1-butyn-3-oxy)silane  
(boiling point: above 170° C.)

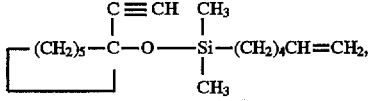

dimethylhexenyl(cyclohexyl-1-ethyn-1-oxy)silane  
(boiling point: above 170° C.)

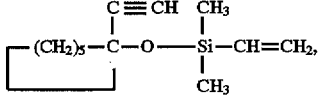

dimethylvinyl(cyclohexyl-1-ethyn-1-oxy)silane  
(boiling point: above 170° C.)

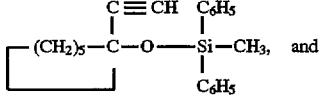

diphenylmethyl(cyclohexyl-1-ethyn-1-oxy)silane  
(boiling point: above 170° C.)

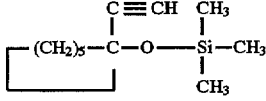

trimethyl(cyclohexyl-1-ethyn-1-oxy)silane.  
(boiling point: above 170° C.)

The silylated acetylenic inhibitors described hereinabove were prepared by reacting chlorosilanes with acetylenic alcohols in the presence of an acid receptor such as picoline or pyridine.

The weight ratio of inhibitor (C) to inhibitor (D) is preferably from about 1/20 to 20/1, even more preferred is about 1/5 to 5/1, and highly preferred is from about 1/3 to 3/1. It is preferred that the total weight of inhibitors, Component (C)+Component (D), be used in amount of from 0.1 to 10 parts by weight per 100 parts by weight of Component (A). When less than 0.1 part by weight are added, the stability when stored at standard temperature decreases, thus, the viscosity varies a great deal over short periods of time. When more than 10 parts by weight are added, the curability of the composition decreases. Preferably from 0.1 to 4 parts by weight of component (C) are used, and from 0.1 to 4 parts by weight of component (D) are used, said parts by weight being based on about 100 parts by weight of component (A).

Component (E) is any platinum group metal-containing catalyst component which facilitates the reaction of the silicon-bonded hydrogen atoms of Component (B) with the silicon-bonded alkenyl radicals of Component (A). By platinum group it is meant herein ruthenium, rhodium, palladium, osmium, iridium and platinum.

Component (E) is preferably a platinum containing catalyst component since they are the most widely used and available and because they provide a more favorable effect for the compositions of this invention in terms of improved release force. Platinum-containing catalysts can be a compound or complex of a platinum group metal. Preferred platinum-containing catalysts include chloroplatinic acid, alcohol modified chloroplatinic acids, olefin complexes of chloroplatinic acid, complexes of chloroplatinic acid and divinyltetramethyldisiloxane, fine platinum particles adsorbed on carbon carriers, and platinum black.

A particularly preferred platinum-containing catalyst component in the compositions of this invention is a form of chloroplatinic acid, either as the commonly available hexahydrate form or as the anhydrous form, as taught by Speier, U.S. Pat. No. 2,823,218, incorporated herein by reference. Another particularly useful catalyst is the composition that is obtained when chloroplatinic acid is reacted with an aliphatically unsaturated organosilicon compound such as divinyltetramethyldisiloxane, as disclosed by Willing, U.S. Pat. No. 3,419,593, incorporated herein by reference, because of its easy dispersibility in organosilicon systems.

The platinum catalysts of Component (E) are well known in the art, many of these being available commercially, and further description thereof is considered unnecessary.

The amount of platinum group metal-containing catalyst component that is used is not narrowly limited as long as there is a sufficient amount to accelerate a room temperature reaction between the silicon-bonded hydrogen atoms of Component (B) with the alkenyl radicals of Component (A) and not so much as to make its action uncontrollable by the use of an inhibitor. The exact necessary amount of this catalyst component will depend on the particular catalyst utilized and is not easily predictable. Component (E) is preferably added at an amount of 1 to 1,000 parts by weight of platinum per one million parts by weight of the total amount of components (A), (B), (C), and (D) and it is highly preferred that the amount is from 30 to 600 parts by weight of platinum for every one million parts by weight of the total amount of components (A), (B), (C), and (D).

The optional diluent (F) is exemplified by aliphatic hydrocarbons such as pentane, hexane, heptane, octane, nonane, and the like; aromatic hydrocarbons such as benzene, toluene, and xylene; ketones such as acetone, methylethyl ketone, and methylisobutyl ketone, and halogenated diluents such as fluorine-, chlorine-, or bromine-substituted aliphatic or aromatic hydrocarbons such as trichloroethane, perchloroethylene, bromobenzene, and the like. Two or more diluents may be used together.

The amount of diluent is not critical and may be readily determined by one skilled in the art. The compositions of this invention may contain up to 10,000 parts by weight of diluent, however it is preferred that from about 500 to 2000 parts by weight be employed per 100 parts by weight of Component (A).

The present invention further relates to a method of making a curable silicone release coating composition comprising (I) homogeneously mixing components (A), (B), (C), (D), (E), and optionally (F) described hereinabove. Components (A)–(F) are as described above including preferred embodiments and amounts thereof.

The composition of the present invention can be easily made by homogeneously mixing components (A), (B), (C), (D), (E), and optionally (F) together. The components may be added in any order. However, it is preferable to first make a mixture of components (A), (B), (C), (D) and optionally (F), preserve this mixture, and then mix component (E) with the mixture just before the release coating composition is used.

The second embodiment of the present invention relates to a curable silicone release coating composition comprising a mixture of (A') an organopolysiloxane containing at least two alkenyl groups per compound, (B') an organohydrogensilicon compound, (C') a conjugated ene-yne inhibitor having a boiling point of up to 130° C. at atmospheric pressure, (D') an inhibitor having a boiling point of at least 170° C. at atmospheric pressure selected from the group consisting of acetylenic alcohols and silylated acetylenic alcohols, (E') a platinum group metal-containing catalyst, and optionally (F') a diluent.

The alkenyl organopolysiloxane of Component (A') is as delineated above for Component (A) including preferred amounts and embodiments thereof. It is highly preferred that Component (A') is a compound having its formula selected from the group consisting of $ViMe_2SiO(Me_2SiO)_xSiMe_2Vi$, $Me_3SiO(Me_2SiO)_x(MeViSiO)_ySiMe_3$, $Me_3SiO(MeViSiO)_ySiMe_3$, $ViMe_2SiO(Me_2SiO)_x(MeViSiO)_ySiMe_2Vi$, $ViMe_2SiO(MeViSiO)_ySiMe_2Vi$ $HexMe_2SiO(Me_2SiO)_xSiMe_2Hex$, $Me_3SiO(Me_2SiO)_x(MeHexSiO)_ySiMe_3$, $Me_3SiO(MeHexSiO)_ySiMe_3$, $HexMe_2SiO(Me_2SiO)_x(MeHexSiO)_ySiMe_2Hex$, and $HexMe_2SiO(MeHexSiO)_ySiMe_2Hex$ wherein Me, Vi, and Hex denote methyl, vinyl, and 5-hexenyl, respectively, x has a value of from greater than zero to 7000, and y has a value of from greater than zero to 350.

The organohydrogensilicon compound of Component (B') is as delineated above for Component (B) including preferred amounts and embodiments thereof. It is highly preferred that Component (B') is a compound having its formula selected from the group consisting of $HMe_2SiO(Me_2SiO)_a(MeHSiO)_bSiMe_2H$, $HMe_2SiO(Me_2SiO)_aSiMe_2H$, $Me_3SiO(Me_2SiO)_a(MeHSiO)_bSiMe_3$, $HMe_2SiO(MeHSiO)_bSiMe_2H$, and $Me_3SiO(MeHSiO)_bSiMe_3$ wherein Me denotes methyl wherein a has a value of from greater than zero to 1000 and b has a value of from greater than zero to 200.

Component (C') is a conjugated ene-yne inhibitor having a boiling point of up to 130° C. at atmospheric pressure. The combination of Component (C') and component (D') (described hereinbelow), inhibits the addition reaction of the alkenyl group used as component (A') with the silicon-atom-bonded hydrogen atom used as component (B') and it is effective in increasing the stability of the composition when the composition of the present invention is stored. Conjugated ene-ynes are hydrocarbons containing triple bond, i.e. an "yne" bond, and a double bond, i.e. an "ene" bond in conjugation with one another. The conjugated ene-ynes of (C') are exemplified by compounds having the formula

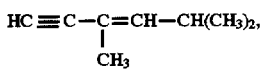

3,5-dimethyl-3-hexene-1-yne
(boiling point: 103° C.)

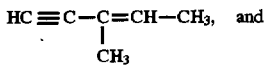

3-methyl-3-pentene-1-yne
(boiling point: 66° C.)

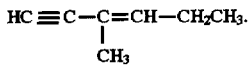

3-methyl-3-hexene-1-yne
(boiling point: below 130° C.)

Component (D') is an inhibitor having a boiling point of at least 170° C. at atmospheric pressure selected from the group consisting of acetylenic alcohols and silylated acetylenic alcohols. The acetylenic alcohols and silylated acetylenic alcohols of (D') are as described above for (D) in the first embodiment of this invention, including preferred embodiments thereof. Component (D') is exemplified by 3-phenyl-1-butyn-3-ol (boiling point: 217° C.), 4-ethyl-1-octyn-3-ol (boiling point: 197° C.), 1-ethynyl-1-cyclohexanol (boiling point: 180° C.), methyltris(3-methyl-1-butyn-3-oxy)silane (boiling point: at least 200° C.), dimethyl bis(3-methyl-1-butyn-3-oxy)silane (boiling point: 186° C.), methylvinylbis(3-methyl-1-butyn-3-oxy)silane (boiling point: at least 200° C.), diphenylmethyl(3-methyl-1-butyn-3-oxy)silane (boiling point: above 170° C.), dimethylphenyl(3-methyl-1-butyn-3-oxy)silane (boiling point: above 170° C.), dimethylhexenyl(3-methyl-1-butyn-3-oxy)silane (boiling point: above 170° C.), triethyl(3-methyl-1-butyn-3-oxy)silane (boiling point: above 170° C.), methyltrifluoropropyl bis(3-methyl-1-butyn-3-oxy)silane (boiling point: above 170° C.), trimethyl(3,5-dimethyl-1-hexyn-3-oxy)silane (boiling point: 171° C.), diphenylmethyl (3-phenyl-1-butyn-3-oxy)silane (boiling point: above 170° C.), dimethylphenyl(3-phenyl-1-butyn-3-oxy)silane (boiling point: above 170° C.), dimethylvinyl(3-phenyl-1-butyn-3-oxy)silane (boiling point: above 170° C.), dimethylhexenyl(3-phenyl-1-butyn-3-oxy)silane (boiling point: above 170° C.), dimethylhexenyl(cyclohexyl-1-ethyn-1-oxy)silane (boiling point: above 170° C.), dimethylvinyl(cyclohexyl-1-ethyn-1-oxy)silane (boiling point: above 170° C.), diphenylmethyl(cyclohexyl-1-ethyn-1-oxy)silane (boiling point: above 170° C.), and trimethyl (cyclohexyl-1-ethyn-1-oxy)silane (boiling point: above 170° C.).

The amounts of components (C') and (D'), respectively, are as described hereinabove for components (C) and (D), respectively, including preferred embodiments thereof. Preferably from 0.1 to 4 parts by weight of component (C') are used, and from 0.1 to 4 parts by weight of component (D') are used, said parts by weight being based on about 100 parts by weight of component (A').

The platinum group metal-containing catalyst of Component (E') is as delineated above for Component (E) including preferred amounts and embodiments thereof. It is highly preferred that Component (E') is selected from chloroplatinic acid or chloroplatinic acid-divinyltetramethyldisiloxane complexes.

The optional diluent (F') is as described above for component (F) in the first embodiment of this invention including preferred embodiments and amounts thereof.

The present invention further relates to a method of making a curable silicone release coating composition comprising (I) homogeneously mixing components (A'), (B'), (C'), (D'), (E') and optionally (F'). Components (A')–(F') are as described above including preferred embodiments and amounts thereof.

The composition of the present invention can be easily made by homogeneously mixing components (A'), (B'), (C'), (D'), (E') and optionally (F') together. The components may be added in any order. However, it is preferable to first make a mixture of components (A'), (B'), (C'), (D') and optionally (F'), preserve this mixture, and then mix component (E') with the mixture just before the release coating composition is used.

The compositions of this invention can contain any optional components commonly used in platinum group metal catalyzed organosilicon compositions, such as reinforcing and extending fillers, hydrocarbons and halohydrocarbons free of aliphatic unsaturation, colorants, stabilizers, adhesion modifiers, adhesive-release modifiers, etc. In particular, the coating compositions of this invention which have adhesive-releasing properties can further comprise the well-known high release additives of the art.

The compositions of this invention have utility as formable compositions to provide organosilicon articles such as O-rings, tubing, wire-coating, gaskets, encapsulant and sealant compositions, and as coating compositions. The compositions of the present invention have particular utility as release coatings.

In another aspect the present invention relates to a coated article prepared by a method comprising (I) applying a curable silicone coating composition on the surface of a substrate wherein the composition is prepared by mixing components (A–E and optionally F) or (A'–E' and optionally F'), and (II) exposing the coating and substrate to an energy source selected from the group consisting of (i) heat and (ii) actinic radiation in an amount sufficient to cure the coating. The method can further comprise applying a pressure sensitive adhesive on the coated substrate after step (II).

By actinic radiation it is meant ultraviolet light, electron beam radiation, and alpha-, beta-, gamma- and x-rays. By heat it is meant infrared radiation, hot-air, or microwave radiation. Of course actinic radiation is frequently accompanied by heat and the use of a combination of the two falls within the scope and spirit of the present method. In this method of this invention, the application of the silicone release coating composition to the substrate can be accomplished by any suitable manner known in the art, such as by spreading, brushing, extruding, spraying, gravure, kiss-roll and air-knife.

In a preferred embodiment of the instant method, the solid substrate is a flexible sheet material such as paper, polyolefin film, polyolefin-coated paper, foil, plastic film, woven cloth, or nonwoven cloth. Other suitable solid substrates that can be coated by the method of this invention include other cellulosic materials such as wood, cardboard and cotton, metallic materials such as aluminum, copper, steel and silver, siliceous materials such as glass and stone, and synthetic polymer materials such as polyolefins, polyamides, polyesters and polyacrylates. As to the form of the solid substrate, it can be substantially sheet-like, such as a peelable release liner for pressure sensitive adhesive, a fabric or a foil, or substantially three-dimensional in form.

After the curable silicone release coating composition has been coated onto a substrate it is heated at 50°–200° C., and especially at 100°–150° C. and/or irradiated with actinic radiation, as noted herein, to cure the liquid coating and to adhere it to the substrate.

In a preferred embodiment of the method of this invention, a flexible sheet material, such as paper, metal foil or tapestock, is coated with a thin coating of the liquid curable silicone release coating composition, preferably in a continuous manner and the thus-coated material is then heated and/or irradiated to rapidly cure the coating, to provide a sheetlike material bearing on at least one surface thereof an adhesive-releasing coating. The adhesive-releasing coating is subsequently brought into contact with a pressure sensitive adhesive, to form an article having a peelable, i.e. releasable, adhesive/coating interface. Examples of such an article include, adhesive labels having a peelable backing, adhesive tape in roll form and adhesive packaged in a strippable container. The pressure sensitive adhesive can be non-silicone-based, such as the well-known acrylic or rubber types or silicone-based, such as the peroxide-or platinum-curable polydiorganosiloxane-based adhesives.

The method of this invention is also applicable to adhesive materials, other than pressure sensitive adhesives. Examples of said adhesive materials include foods, asphalt and gum polymers.

In the examples, "parts" means "parts by weight" the viscosity is indicated as a measured value at 25° C., and viscosities were measured in millipascal-seconds (mPa·s) where 1 millipascal-second=1 centipoise (cP).

The pot life was determined by adding 200 grams of the silicone release coating composition into a 450 milliliter (ml) glass jar, and then stirring it at 25° C. in order to measure the viscosity of the mixture at a specific time (immediately after mixing, after 2 hours, and after 8 hours).

Gelation time on thin film was determined by coating a polyethylene film (PET film) with 10 um (microns) of the silicone release coating composition using an applicator, and then the coated film was allowed to stand at room temperature. The time required for the gelation of the composition was measured.

The cure time of the silicone release coating composition was determined by adding about 200 g of the silicone release coating composition into a 450 (ml) glass bottle with stirring at 25° C.. The composition was then removed from the bottle at specific times (immediately after mixing, after 2 hours, and after 8 hours), then a polyethylene laminated paper was coated with about 1.0 g/m$^2$ of the composition, then heated and cured in a hot-air circulating oven at 110° C. The time (sec) required to form the cured film was measured. The film surface was rubbed with the thumb while the cured film was forming, when no cured film was removed, the cured film was determined to have formed.

The peel resistance was determined by applying the silicone release coating to polyethylene laminated paper as described above, then heated and cured for 30 seconds in a hot rotary oven at 130° C. Then, the cured film surface was coated with Olivine BPS-5127 (an acrylic solvent-type adhesive from Toyo Ink Manufacturing Co., Ltd.) and heated for 2 minutes at 70° C. Then, Rumira S-1025m (a polyester film made by Toray, Ind.) was then laminated to the adhesive surface. The laminate was aged for one day at 25° C. under a load of 20 g/cm$^2$, then cut (5 cm wide) to make samples. Then, the polyester film was pulled at a peeling rate of 0.3 m/min at 180° using a tensile strength test apparatus to measure tensile strength (g).

The percentage of residual adhesion was determined by contacting Nitto Polyester Tape 31B (a polyester adhesive tape made by Nitto Denko K. K.) to the cured film surface and then heating the film and tape at 70° C. under a load of 20 g/cm$^2$ for 20 hours. The tape was then peeled. Then, the film was adhered to a stainless steel flat using a rubber roller (2 kg). It was then aged at 25° C. under a load of 20 kg/cm$^2$ for 30 minutes. Then the film was pulled at a peeling rate of 0.3 m/min at 180° using a tensile strength test apparatus to measure the residual tensile strength (g). Polyester adhesive tape was adhered to a stainless steel flat using a rubber roller (2 kg) and it was then used for measurements of adhesion (g) under the same conditions. This result was used for measuring basic adhesion. The residual adhesion percentage was obtained using the above-mentioned measured values in the following equation:

Residual adhesion (percentage)=(residual adhesion/basic adhesion)×100.

The silicone coating compositions were tested for Thin Film Bath Life in the following manner. This test was run under typical laboratory conditions (about 20° C. with varying relative humidity) in a location free from significant air movement. The silicone coating was applied with a 0.005 inches (125 microns) gapped drawn-down device (i.e. BIRD bar) onto a clean piece of 0.002 inches (50 microns) thick polyester film. The area of the draw-down is approximately 3 inches×6 inches. The coating is then evaluated periodically (i.e. every 5 minutes) until it is tack-free in the center (i.e. the center of the film is no longer sticky or fluid). The time (in minutes) that this occurs is then recorded as the Thin-Film Bath Life.

EXAMPLE 1

About 100 parts of an organopolysiloxane having the general formula HexMe$_2$SiO(Me$_2$SiO)$_a$(MeHexSiO)$_b$SiMe$_2$Hex having 3 mole percent (%) hexenyl groups, having a viscosity of about 400 mPa·s, and wherein Me denotes methyl and Hex denotes 5-hexenyl (—(CH$_2$)$_4$CH=CH$_2$) was mixed with about 6 parts of a trimethylsilyl-terminated methylhydrogenpolysiloxane having a viscosity of 20 mPa·s. Next about 0.2 parts of 3-methyl-1-butyn-3-ol (boiling point: 104° C.) and 0.3 parts of methylvinylbis(3-methyl-1-butyn-3-oxy)silane (boiling point: at least 200° C.) was added to the mixture and the resulting mixture was mixed until it was homogeneous. Next, a complex of platinum and divinyltetramethyldisiloxane (whose amount was equivalent to 100 ppm of platinum for 100 parts of the hexenyl functional organopolysiloxane) was added to the mixture and the mixture was again stirred until it was homogeneous to form a silicone release coating composition (composition A).

The pot life, gelation time on thin film, curability, peel resistance, and residual adhesion percentage were then measured. Tables I–IV show the measurement results.

For comparison, a silicone release coating composition (composition B, Comparative Example C1) was made using the same method as above except that 0.5 parts of 3-methyl-1-butyn-3-ol was used instead of the inhibitor mixture of Example 1.

A silicone release coating composition (composition C, Comparative Example C2) was also made using the same method as above except that 0.5 parts of methylvinylbis(3-methyl-1-butyn-3-oxy)silane was used instead of the inhibitor mixture of Example 1.

A silicone release coating composition (composition D, Comparative Example C3) was also made using the same method as above except that 0.5 parts of methyltris(3- methyl-1-butyn-3-oxy)silane (boiling point: at least 200° C.) was used instead of the inhibitor mixture of Example 1. The properties of the compositions were measured by the methods described hereinabove. Tables I–IV show the measurement results.

For comparison, a silicone release coating composition (composition E, Comparative Example C4) was made using the same method as above except that 0.2 parts of 3-methyl-1-butyn-3-ol and 0.3 parts of 3,5-dimethyl-1-hexyn-3-ol (boiling point: 150° C.) was used instead of the inhibitor mixture of Example 1.

A silicone release coating composition (composition F, Comparative Example C5) was made using the same method as above except that 0.2 parts of 3,5-dimethyl-1-hexyn-3-ol (boiling point: 150° C.) and 0.3 parts of methylvinylbis(3-methyl-1-butyn-3-oxy)silane (boiling point: at least 200° C.) were used in place of the inhibitor mixture of Example 1. The properties of the compositions were measured by the methods described hereinabove. Tables I–IV show the measurement results.

As seen in Table III, the compositions made in Comparative Examples C1 and C4 had cure rates that were as good as those of the composition made in Example 1. However, as seen in Table II, the comparative compositions had extremely short gelation times on thin films.

The compositions made in Comparative Examples C2, C3, and C5 had poorer cure rates than that of the composition made in Example 1, as seen Table III.

TABLE I

| Example | Composition | Viscosity immediately after mixing (mPa · s) | Viscosity after 2 hours (mPa · s) | Viscosity after 8 hours (mPa · s) |
|---|---|---|---|---|
| 1 | A | 350 | 360 | 385 |
| C1 | B | 360 | 390 | 480 |
| C2 | C | 350 | 355 | 370 |
| C3 | D | 355 | 360 | 365 |
| C4 | E | 350 | 380 | 460 |
| C5 | F | 355 | 360 | 370 |

TABLE II

| Example | Composition | Gelation Time (hours) |
|---|---|---|
| 1 | A | 4.50 |
| C1 | B | 0.75 |
| C2 | C | 5.50 |
| C3 | D | 6.50 |
| C4 | E | 1.25 |
| C5 | F | 5.00 |

TABLE III

| Example | Composition | Cure time immediately after mixing (sec) | Cure time after 2 hours (sec) | Cure time after 8 hours (sec) |
|---|---|---|---|---|
| 1 | A | 20 | 25 | 35 |
| C1 | B | 15 | 20 | 25 |
| C2 | C | 35 | 45 | 70 |
| C3 | D | 50 | 60 | 100 |
| C4 | E | 15 | 20 | 25 |
| C5 | F | 35 | 40 | 50 |

TABLE IV

| Example | Composition | Peel Resistance | Residual Adhesion (Percent) |
|---|---|---|---|
| 1 | A | 26 | 97 |
| C1 | B | 23 | 97 |
| C2 | C | 38 | 95 |
| C3 | D | 47 | 94 |
| C4 | E | 24 | 97 |
| C5 | F | 41 | 95 |

EXAMPLE 2

About 100 parts of an organopolysiloxane having the general formula HexMe$_2$SiO(Me$_2$SiO)$_a$(MeHexSiO)$_b$SiMe$_2$Hex having 3 mole percent (%) hexenyl groups, having a viscosity of about 400 mPa·s, and wherein Me denotes methyl and Hex denotes 5-hexenyl (—(CH$_2$)$_4$CH=CH$_2$) was mixed with about 6 parts of a trimethylsilyl-terminated methylhydrogenpolysiloxane having a viscosity of 20 mPa·s. Next about 0.2 parts of 3-methyl-1-pentyn-3-ol (boiling point: 121° C.) and 0.3 parts of methylvinylbis(3-methyl-1-butyn-3-oxy)silane (boiling point: at least 200° C.) was added to the mixture and the resulting mixture was stirred until it was homogeneous. Next, a complex of platinum and divinyltetramethyldisiloxane (whose amount was equivalent to 100 ppm of platinum for 100 parts of the hexenyl functional organopolysiloxane) was added to the mixture and the mixture was again stirred until it was homogeneous to form a silicone release coating composition (composition G).

The cure time of the composition was measured by the method described above. The results are shown in Table V below.

The gelation time on thin film, peel resistance, and residual adhesion (percentage) of the composition were also measured by the method described above and the results are as follows: Gelation time on thin film: 5.0 hours, peel resistance: 25 g/5 cm, and the residual adhesion (percentage): 98%.

TABLE V

| Example | Composition | Cure time immediately after mixing (sec) | Cure time after 2 hours (sec) | Cure time after 8 hours (sec) |
|---|---|---|---|---|
| 2 | G | 25 | 30 | 35 |

EXAMPLES 3–5

About 96 grams of an organopolysiloxane having the general formula HexMe$_2$SiO(Me$_2$SiO)$_a$(MeHexSiO)$_b$SiMe$_2$Hex having 2 mole percent (%) hexenyl groups, having a degree of polymerization of about 100, and wherein Me denotes methyl and Hex denotes 5-hexenyl (—(CH$_2$)$_4$CH=CH$_2$) was mixed with 4 grams of a trimethylsiloxy-endblocked-polydimethylsiloxane-methylhydrogensiloxane copolymer having a total average degree of polymerization of about 40 and about 70 mole % methylhydrogen moiety on the siloxane chain in a 4 ounce jar. Next, about 2.1 grams of trimethyl(3-methyl-1-butyn-3-oxy)silane (boiling point: 115° C.) and 0.31 grams of methylvinylcyclosiloxane (boiling point: at least 200° C.) was added to the mixture and the resulting mixture was stirred until it was homogeneous. Finally, with stirring, about 1.9 grams of a platinum catalyst (a soluble platinum complex containing about 0.50% platinum formed from chloroplatinic acid and divinyltetramethyldisiloxane) was added to this mixture and the resulting mixture was then stirred until it was homogeneous to form a silicone release coating (Composition H).

A second silicone release coating composition (composition I) was made according to the method used to prepare composition H above, except that 2.1 grams of trimethyl(3-methyl-1-butyn-3-oxy)silane and 0.51 grams of methylvinylcyclosiloxane were used.

A third silicone release coating composition (composition J) was made according to the method used to prepare composition H above, except that 2.1 grams of trimethyl(3-methyl-1-butyn-3-oxy)silane and 0.11 grams of methylvinylcyclosiloxane were used.

For comparison, a silicone release coating composition (composition K, Comparative Example C6) was made according to the method used to prepare composition H above, except that 2.1 grams of trimethyl(3-methyl-1-butyn-3-oxy)silane was used in place of the inhibitor mixture of Composition H (i.e. no methylvinylcyclosiloxane was used). The resulting silicone coatings were then tested for thin film bath life (TFBL) by the method described above. The results are shown in Table VI hereinbelow.

TABLE VI

| Example | Composition | TFBL (min.) |
|---|---|---|
| 3 | H | 45 |
| 4 | I | 65 |
| 5 | J | 20 |
| C6 | K | 10 |

EXAMPLE 6

About 97.29 grams of an organopolysiloxane having the general formula $HexMe_2SiO(Me_2SiO)_a(MeHexSiO)_bSiMe_2Hex$ having 2 mole percent (%) hexenyl groups, having a degree of polymerization of about 100, and wherein Me denotes methyl and Hex denotes 5-hexenyl ($-(CH_2)_4CH=CH_2$) was mixed with 4.57 grams of a trimethylsiloxy-endblocked-polydimethylsiloxane-methylhydrogensiloxane copolymer having a total average degree of polymerization of about 40 and about 70 mole % methylhydrogen moiety on the siloxane chain in a 4 ounce jar. Next, about 2.0 grams of trimethyl(3-methyl-1-butyn-3-oxy)silane (boiling point: 115° C.) and 0.30 grams of methylvinylcyclosiloxane (boiling point: at least 200° C.) was added to the mixture and the resulting mixture was stirred until it was homogeneous. Finally, with stirring, about 1.9 grams of a platinum catalyst (a soluble platinum complex containing about 0.50% platinum formed from chloroplatinic acid and divinyltetramethyldisiloxane) was added to this mixture and the resulting mixture was then stirred until it was homogeneous to form a silicone release coating (Composition L).

For comparison, a silicone release coating composition (composition M, Comparative Example C7) was made according to the method used to prepare composition L above, except that 0.35 grams of 3,5-dimethyl-1-hexyn-3-ol (boiling point: 150° C.) was used in place of the inhibitor mixture of Composition L. The resulting silicone coatings were then tested for cure time in seconds at 82.2° C. (180° F.) and thin film bath life (TFBL) by the methods described above. The results are shown in Table VII hereinbelow.

TABLE VII

| Example | Composition | TFBL (min.) | Cure Time (sec.) |
|---|---|---|---|
| 6 | L | 47 | 5.5 |
| C7 | M | 10 | 10.0 |

It can be seen from the examples hereinabove that silicone release coating compositions containing the specific inhibitor mixtures of the present invention have improved balance of cure and bath life properties in comparison to silicone release coating compositions which contain a single inhibitor or mixture of inhibitors which fall outside the scope of this invention.

That which is claimed is:

1. A curable silicone release coating composition comprising a mixture of:

(A) an organopolysiloxane containing at least two alkenyl groups per compound;

(B) an organohydrogensilicon compound;

(C) an inhibitor having a boiling point of up to 130° C. at atmospheric pressure selected from the group consisting of acetylenic alcohols and silylated acetylenic alcohols;

(D) an inhibitor having a boiling point of at least 170° C. at atmospheric pressure selected from the group consisting of vinylcyclosiloxanes, acetylenic alcohols, and silylated acetylenic alcohols;

(E) a platinum group metal-containing catalyst; and optionally (F) a diluent.

2. A composition according to claim 1, wherein (A) is an organopolysiloxane compound having its formula selected from the group consisting of $$R^1_3SiO(R_2SiO)_x(RR^1SiO)_ySiR^1_3, \quad (i)$$

$$R^1_3SiO(R_2SiO)_xSiR^1_3, \quad (ii)$$

and $$R^1_3SiO(RR^1SiO)_ySiR^1_3 \quad (iii)$$

wherein R is independently selected from monovalent hydrocarbon or halohydrocarbon radicals free of aliphatic unsaturation and having from 1 to 20 carbon atoms, $R^1$ is independently selected from the group consisting of R and an alkenyl group, x has a value of from greater than zero to 7000, and y has a value of from greater than zero to 350 with the proviso that there are at least two alkenyl groups per compound.

3. A composition according to claim 2, wherein $R^1$ is a group having the formula $-(CH_2)_mCH=CH_2$ or $-(CH_2)_nCH=CH-(CH_2)_pCH=CH_2$ wherein m has a value of 0 to 20, n has the value of 0 to 9, and p has the value of 3, 4, or 5.

4. A composition according to claim 2, wherein (A) is an organopolysiloxane compound having its formula selected from the group consisting of $ViMe_2SiO(Me_2SiO)_xSiMe_2Vi$, $Me_3SiO(Me_2SiO)_x(MeViSiO)_ySiMe_3$, $Me_3SiO(MeViSiO)_ySiMe_3$, $ViMe_2SiO(Me_2SiO)_x(MeViSiO)_ySiMe_2Vi$, $ViMe_2SiO(MeViSiO)_ySiMe_2Vi$ $HexMe_2SiO(Me_2SiO)_xSiMe_2Hex$, $Me_3SiO(Me_2SiO)_x(MeHexSiO)_ySiMe_3$, $Me_3SiO(MeHexSiO)_ySiMe_3$, $HexMe_2SiO(Me_2SiO)_x(MeHexSiO)_ySiMe_2Hex$, and $HexMe_2SiO(MeHexSiO)_ySiMe_2Hex$ wherein Me, Vi, and Hex denote methyl, vinyl, and 5-hexenyl, respectively, x has a value of from greater than zero to 7000, and y has a value of from greater than zero to 350.

5. A composition according to claim 1, wherein (B) is a compound having its formula selected from the group consisting of $HMe_2SiO(Me_2SiO)_a(MeHSiO)_bSiMe_2H$, $HMe_2SiO(Me_2SiO)_aSiMe_2H$, $Me_3SiO(Me_2SiO)_a(MeHSiO)_bSiMe_3$, $HMe_2SiO(MeHSiO)_bSiMe_2H$, and $Me_3SiO(MeHSiO)_bSiMe_3$ wherein Me denotes methyl wherein a has a value of from greater than zero to 1000 and b has a value of from greater than zero to 200.

6. A composition according to claim 1, wherein (C) is selected from the group consisting of 1-butyn-3-ol, 1-propyn-3-ol, 3-methyl-1-butyn-3-ol, 3-methyl-1-pentyn-3-ol, and trimethyl(3-methyl-1-butyn-3-oxy)silane.

7. A composition according to claim 1, wherein (D) is selected from the group consisting of a vinylcyclosiloxane having the average formula $(R^2CH_2=CHSiO)_m$ wherein each m has an integer value of 3 to 9 and $R^2$ denotes methyl, ethyl, or phenyl, 3-phenyl-1-butyn-3-ol, 4-ethyl-1-octyn-3-ol, 1-ethynyl-1-cyclohexanol, methyltris(3-methyl-1-butyn-3-oxy) silane, dimethyl bis(3-methyl-1-butyn-3-oxy)silane, methylvinylbis(3-methyl-1-butyn-3-oxy)silane, diphenylmethyl(3-methyl-1-butyn-3-oxy)silane, dimethylphenyl(3-methyl-1-butyn-3-oxy)silane, dimethylhexenyl(3-methyl-1-butyn-3-oxy)silane, triethyl(3-methyl-1-butyn-3-oxy)silane, methyltrifluoropropyl bis(3-methyl-1-butyn-3-oxy)silane, trimethyl(3,5-dimethyl-1-hexyn-3-oxy)silane, diphenylmethyl(3-phenyl-1-butyn-3-oxy)silane, dimethylphenyl(3-phenyl-1-butyn-3-oxy)silane, dimethylvinyl(3-phenyl-1-butyn-3-oxy)silane, dimethylhexenyl(3-phenyl-1-butyn-3-oxy)silane, dimethylhexenyl(cyclohexyl-1-ethyn-1-oxy)silane, dimethylvinyl(cyclohexyl-1-ethyn-1-oxy)silane, diphenylmethyl(cyclohexyl-1-ethyn-1-oxy)silane, and trimethyl(cyclohexyl-1-ethyn-1-oxy)silane.

8. A composition according to claim 1, wherein (E) is selected from the group consisting of chloroplatinic acid and chloroplatinic acid-divinyltetramethyldisiloxane complexes.

9. A composition according to claim 1, wherein (F) is selected from the group consisting of pentane, hexane, heptane, octane, nonane, benzene, toluene, xylene, acetone, methylethyl ketone, methylisobutyl ketone, trichloroethane, perchloroethylene, and bromobenzene.

10. A curable silicone release coating composition obtained by a method comprising homogeneously mixing:

(A) an organopolysiloxane containing at least two alkenyl groups per compound;

(B) an organohydrogensilicon compound;

(C) an inhibitor having a boiling point of up to 130° C. at atmospheric pressure selected from the group consisting of acetylenic alcohols and silylated acetylenic alcohols;

(D) an inhibitor having a boiling point of at least 170° C. at atmospheric pressure selected from the group consisting of vinylcyclosiloxanes, acetylenic alcohols, and silylated acetylenic alcohols;

(E) a platinum group metal-containing catalyst; and optionally (F) a diluent.

11. A method of making a coated article, the method comprising:

(I) applying a curable silicone coating composition on the surface of a substrate wherein the coating composition is prepared by homogeneously mixing:

(A) an organopolysiloxane containing at least two alkenyl groups per compound;

(B) an organohydrogensilicon compound;

(C) an inhibitor having a boiling point of up to 130° C. at atmospheric pressure selected from the group consisting of acetylenic alcohols and silylated acetylenic alcohols;

(D) an inhibitor having a boiling point of at least 170° C. at atmospheric pressure selected from the group consisting of vinylcyclosiloxanes, acetylenic alcohols, and silylated acetylenic alcohols;

(E) a platinum group metal-containing catalyst; and optionally (F) a diluent; and (II) exposing the coating and the substrate to an energy source selected from the group consisting of (i) heat and (ii) actinic radiation in an amount sufficient to cure the coating.

12. A coated article according to claim 11, wherein the method further comprises applying a pressure sensitive adhesive on the coated substrate after step (II).

13. A coated article produced in accordance with the method of claim 11.

14. A coated article produced in accordance with the method of claim 12.

15. A curable silicone release coating composition comprising a mixture of:

(A') an organopolysiloxane containing at least two alkenyl groups per compound;

(B') an organohydrogensilicon compound;

(C') a conjugated ene-yne inhibitor having a boiling point of up to 130° C. at atmospheric pressure;

(D') an inhibitor having a boiling point of at least 170° C. at atmospheric pressure selected from the group consisting of acetylenic alcohols and silylated acetylenic alcohols;

(E') a platinum group metal-containing catalyst; and optionally (F') a diluent.

16. A composition according to claim 15, wherein (A') is an organopolysiloxane compound having its formula selected from the group consisting of

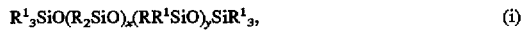   (i)

   (ii)

and

   (iii)

wherein R is independently selected from monovalent hydrocarbon or halohydrocarbon radicals free of aliphatic unsaturation and having from 1 to 20 carbon atoms, $R^1$ is independently selected from the group consisting of R and an alkenyl group, x has a value of from greater than zero to 7000, and y has a value of from greater than zero to 350 with the proviso that there are at least two alkenyl groups per compound.

17. A composition according to claim 16, wherein $R^1$ is a group having the formula $—(CH_2)_mCH=CH_2$ or $—(CH_2)_nCH=CH—(CH_2)_pCH=CH_2$ wherein m has a value of 0 to 20, n has the value of 0 to 9, and p has the value of 3, 4, or 5.

18. A composition according to claim 16, wherein (A') is an organopolysiloxane compound having its formula selected from the group consisting of $ViMe_2SiO(Me_2SiO)_xSiMe_2Vi$, $Me_3SiO(Me_2SiO)_x(MeViSiO)_ySiMe_3$, $Me_3SiO(MeViSiO)_ySiMe_3$, $ViMe_2SiO(Me_2SiO)_x(MeViSiO)_ySiMe_2Vi$, $ViMe_2SiO(MeViSiO)_ySiMe_2Vi$ $HexMe_2SiO(Me_2SiO)_xSiMe_2Hex$, $Me_3SiO(Me_2SiO)_x(MeHexSiO)_ySiMe_3$, $Me_3SiO(MeHexSiO)_ySiMe_3$, $HexMe_2SiO(Me_2SiO)_x(MeHexSiO)_ySiMe_2Hex$, and $HexMe_2SiO(MeHexSiO)_ySiMe_2Hex$ wherein Me, Vi, and Hex denote methyl, vinyl, and 5-hexenyl, respectively, x has a value of from greater than zero to 7000, and y has a value of from greater than zero to 350.

19. A composition according to claim 15, wherein (B') is a compound having its formula selected from the group consisting of HMe$_2$SiO(Me$_2$SiO)$_a$(MeHSiO)$_b$SiMe$_2$H, HMe$_2$SiO(Me$_2$SiO)$_a$SiMe$_2$H, Me$_3$SiO(Me$_2$SiO)$_a$(MeHSiO)$_b$SiMe$_3$, HMe$_2$SiO(MeHSiO)$_b$SiMe$_2$H, and Me$_3$SiO(MeHSiO)$_b$SiMe$_3$ wherein Me denotes methyl wherein a has a value of from greater than zero to 1000 and b has a value of from greater than zero to 200.

20. A composition according to claim 15, wherein (C') is selected from the group consisting of 3,5-dimethyl-3-hexene-1-yne, 3-methyl-3-pentene-1-yne, and 3-methyl-3-hexene-1-yne.

21. A composition according to claim 15, wherein (D') is selected from the group consisting of 3-phenyl-1-butyn-3-ol, 4-ethyl-1-octyn-3-ol, 1-ethynyl-1-cyclohexanol, methyltris(3-methyl-1-butyn-3-oxy) silane, dimethyl bis(3-methyl-1-butyn-3-oxy)silane, methylvinylbis(3-methyl-1-butyn-3-oxy)silane, diphenylmethyl(3-methyl-1-butyn-3-oxy)silane, dimethylphenyl(3-methyl-1-butyn-3-oxy)silane, dimethylhexenyl(3-methyl-1-butyn-3-oxy)silane, triethyl(3-methyl-1-butyn-3-oxy)silane, methyltrifluoropropyl bis(3-methyl-1-butyn-3-oxy)silane, trimethyl(3,5-dimethyl-1-hexyn-3-oxy)silane, diphenylmethyl(3-phenyl-1-butyn-3-oxy)silane, dimethylphenyl(3-phenyl-1-butyn-3-oxy)silane, dimethylvinyl(3-phenyl-1-butyn-3-oxy)silane, dimethylhexenyl(3-phenyl-1-butyn-3-oxy)silane, dimethylhexenyl(cyclohexyl-1-ethyn-1-oxy)silane, dimethylvinyl(cyclohexyl-1-ethyn-1-oxy)silane, diphenylmethyl(cyclohexyl-1-ethyn-1-oxy)silane, and trimethyl(cyclohexyl-1-ethyn-1-oxy)silane.

22. A composition according to claim 15, wherein (E') is selected from the group consisting of chloroplatinic acid and chloroplatinic acid-divinyltetramethyldisiloxane complexes.

23. A composition according to claim 15, wherein (F') is selected from the group consisting of pentane, hexane, heptane, octane, nonane, benzene, toluene, xylene, acetone, methylethyl ketone, methylisobutyl ketone, trichloroethane, perchloroethylene, and bromobenzene.

24. A curable silicone release coating composition obtained by a method comprising homogeneously mixing:

(A') an organopolysiloxane containing at least two alkenyl groups per compound;

(B') an organohydrogensilicon compound;

(C') a conjugated ene-yne inhibitor having a boiling point of up to 130° C. at atmospheric pressure;

(D') an inhibitor having a boiling point of at least 170° C. at atmospheric pressure selected from the group consisting of acetylenic alcohols and silylated acetylenic alcohols;

(E') a platinum group metal-containing catalyst; and optionally (F') a diluent.

25. A method of making a coated article, the method comprising:

(I) applying a curable silicone coating composition on the surface of a substrate wherein the coating composition is prepared by homogeneously mixing:

(A') an organopolysiloxane containing at least two alkenyl groups per compound;

(B') an organohydrogensilicon compound;

(C') a conjugated ene-yne inhibitor having a boiling point of up to 130° C. at atmospheric pressure;

(D') an inhibitor having a boiling point of at least 170° C. at atmospheric pressure selected from the group consisting of acetylenic alcohols and silylated acetylenic alcohols;

(E') a platinum group metal-containing catalyst; and optionally (F') a diluent; and (II) exposing the coating and the substrate to an energy source selected from the group consisting of (i) heat and (ii) actinic radiation in an amount sufficient to cure the coating.

26. A coated article according to claim 25, wherein the method further comprises applying a pressure sensitive adhesive on the coated substrate after step (II).

27. A coated article produced in accordance with the method of claim 25.

28. A coated article produced in accordance with the method of claim 26.

* * * * *